United States Patent [19]

Fischer

[11] 4,286,698

[45] Sep. 1, 1981

[54] SLIDING CONTACT FOR A TOY VEHICLE

[76] Inventor: Artur Fischer, Weinhalde 34, 7244 Waldachtal 3/Tumlingen, Fed. Rep. of Germany

[21] Appl. No.: 93,617

[22] Filed: Nov. 9, 1979

[30] Foreign Application Priority Data

Dec. 16, 1978 [DE] Fed. Rep. of Germany .. 7837353[U]

[51] Int. Cl.³ .............................................. B60L 5/38
[52] U.S. Cl. ..................................................... 191/49
[58] Field of Search ................................ 191/49, 59.1; 46/257–259, 217, 260, 261

[56] References Cited

U.S. PATENT DOCUMENTS

| | | | |
|---|---|---|---|
| 1,308,534 | 7/1919 | Taylor | 191/49 |
| 1,308,543 | 7/1919 | Howe | 191/49 |
| 1,308,544 | 7/1919 | Howe | 191/49 |
| 2,659,317 | 11/1953 | Bonanno | 191/49 X |
| 3,847,256 | 11/1974 | Zurek | 191/49 |

Primary Examiner—Richard A. Schacher
Attorney, Agent, or Firm—Michael J. Striker

[57] ABSTRACT

A sliding contact for a toy rail vehicle has a body part having a convex slide face and a depression which is provided in the convex slide face and arranged so as to form on the latter an edge by which said slide face linearly contacts with a current-conductive rail and which removes extraneous particles from the current-conductive rail during sliding over the latter. The depression may have a circular cross-section so that the edge formed by the depression is annular. The depression may have a diameter which exceeds the width of the rail so that two curved edges are formed one of which is a leading edge, whereas the other of which is a trailing edge.

5 Claims, 1 Drawing Figure

U.S. Patent
Sep. 1, 1981
4,286,698
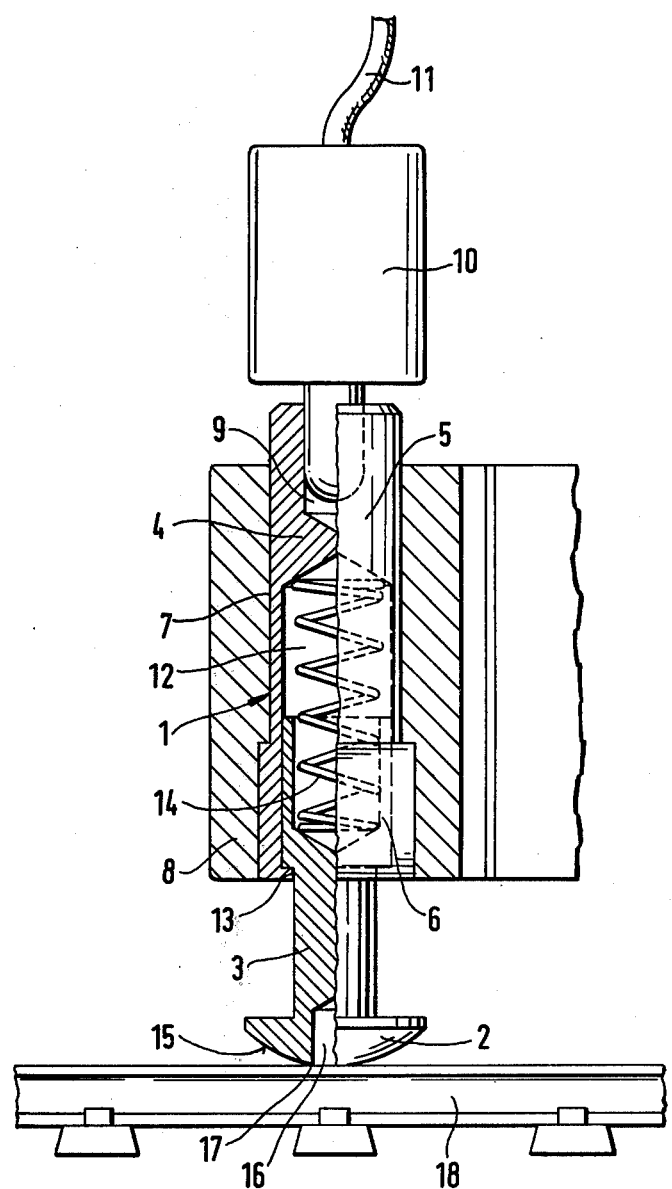

SLIDING CONTACT FOR A TOY VEHICLE

BACKGROUND OF THE INVENTION

The present invention relates to a sliding contact for a toy vehicle. More particularly, it relates to a sliding contact for transmission of current from a current-conductive rail of a toy railroad to an electric motor which drives a toy vehicle.

Sliding contacts of the above-mentioned general type are known in the art. A known sliding contact has a flange-shaped sliding head which is provided with a convex sliding face and extends laterally beyond both sides of a rail. Because of the convex sliding face, the sliding contact attains favorable friction condition, on the one hand, and blocking of the sliding contact in the region of rail connection or deflection is avoided. However, this contact possesses the disadvantage in that its sliding face is only in point contact with the rail, which can lead to interruption in current transmission, especially when the rails are dirtied. When the sliding contact slides over the rails, dust and dirt particles deposit around the contact point of the convex slide face so that the sliding contact can be lifted from the rail.

SUMMARY OF THE INVENTION

Accordingly, it is an object of the present invention to provide a sliding contact which avoids the disadvantages of the prior art.

More particularly, it is an object of the present invention to provide such a sliding contact which contacts a rail of a railroad in a linear sliding contact and which simultaneously removes dust or dirt particles from the rail during sliding.

In keeping with these objects and with others which will become apparent hereinafter, one feature of the present invention resides, briefly stated, in a sliding contact in which a body part provided with a convex slide face has a depression in the convex slide face which is so arranged that the depression forms on the convex slide face an edge by which the slide face linearly contacts with a current-conductive rail and which removes extraneous particles from the latter during sliding.

When the sliding contact is designed in accordance with the present invention, it provides for the following highly advantageous results. Due to the provision of the depression on the convex slide face of the sliding head, a sharp edge is formed on the latter. Instead of being in a point contact, this sharp edges brings the slide surface of the sliding contact into a linear contact which is favorable in the sense of current transmission. The sharp edge moreover, rubs the rail, so that during the operation constant cleaning of the rails is attained. Dust or dirt particles can be displaced into the above-mentioned depression. Thereby lifting of the sliding contact from the rail during the operation because of the accumulation of the dust or dirt particles is effectively prevented.

In accordance with another feature of the present invention, the depression is cylindrical so that the edge on the slide face is annular. The diameter of the depression may be greater than the width of the rail. The circular cross-section of the depression results in that the annular edge surrounding the depression in the convex slide face evenly supports the rail with an annular rubbing or shoving edge. Since the diameter of the depression is greater than the width of the rail, two such rubbing or shoving edges are formed, of which one of these edges is leading whereas the other of these edges is trailing. The annular rubbing or shoving edge prevents blocking in the region of connection or joining of the rails. Thereby shock-free running of the sliding contact over these regions is guaranteed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view showing a sliding contact for transmitting current from a rail of a toy railroad to an electric motor of a toy vehicle in accordance with the present invention.

DESCRIPTION OF A PREFERRED EMBODIMENT

A sliding contact in accordance with the present invention is identified in toto by reference numeral 1. It has a contact part 3 and a holding part 4. The contact part 3 is provided with a sliding head 2. The holding part 4 is arranged to hold the contact part 3 as will be explained hereinbelow.

The holding part 4 is subdivided into a cylindrical portion 5 and parallelopiped portion 6. The latter is received in a respective receiving opening 7 of a contact holding plate 8 of a toy vehicle. Since the portion 6 has a parallelopiped form, rotation of the sliding contact is prevented.

The cylindrical portion 5 has an inner hole 9 for receiving a plug 10. The plug 10 is arranged on a connecting cable 11 which provides for electrical connection between the sliding contact and an electric motor of the toy model. The contact part 3 is received in a longitudinal hole 12 of the holding part 4 and held in the latter by bent corrugations 13.

The sliding head 2 of the contact part 3 has a convex slide face 15. A depression 16 formed by a hole is provided in the center of the slide face 15. The depression 16 forms in the slide face an even annular edge 17 which slides over an upper surface of a rail 18. Thereby, current transmission from the rail connected to a current circuit, to the sliding contact is provided. The annular edge 17 rubs or shoves the dust or dirt particles from the rail, and thereby the rail remains clean for proper transmission of current. The dust or dirt particles can be displaced into the depression 6 or because of the circular shape of the annular edge can be stripped off outwardly.

The sliding head 2 of the contact part 3 has dimensions such that the sliding head extends laterally outwardly beyond the rail 18. The depression 16 has a diameter which exceeds the width of the rail 18. Thereby, the annular edge 17 has two edge portions spaced from one another in the direction of elongation of the rail and forming a leading edge and a trailing edge as considered in the direction of sliding of the sliding contact 1 over the rail 18.

It will be understood that each of the elements described, above, or two or more together, may also find a useful application in other types of constructions differing from the types described above.

While the invention has been illustrated and described as embodied in a sliding contact for a toy rail vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sliding contact for a toy vehicle, particularly for current transmission from a current-conductive rail of a toy railroad to an electric motor of the toy vehicle, the sliding contact comprising a body part which has an axis and a side arranged to face toward the current-conductive rail, said body part having a central portion located adjacent to said axis and provided with a depression which is open at said side, and a peripheral portion which surrounds said central portion has a convex face at said side, said convex face of said peripheral portion and said depression of said central portion intersecting one another to form an edge at the location of intersection, so that when said body part slides on the current-conductive rail, an unobstructed gap is formed between said convex face of said peripheral portion of said body part and the current-conductive rail, which gap is immediately followed by said edge linearly contacting the current-conductive rail, whereby said edge not only provides for contact with the current-conductive rail, but also removes extraneous particles from the latter.

2. A sliding contact as defined in claim 1, wherein said body part has a flange-shaped head provided with said portions, said depression being formed in said slide face of said head portion.

3. A sliding contact as defined in claim 2, wherein said head has such a dimension that it laterally overlaps the rail at both sides of the latter.

4. A sliding contact as defined in claim 3, wherein said depression has a circular cross-section so that said edge is annular.

5. A sliding contact as defined in claim 4, wherein the rail has a predetermined width, said depression having a diameter exceeding the width of the rail so that said edge is subdivided into two edge portions one of which edge portions is leading whereas the other edge portion is trailing in the direction of sliding over the current-conductive rail.

* * * * *